(12) United States Patent
Michaelis

(10) Patent No.: US 7,519,800 B2
(45) Date of Patent: Apr. 14, 2009

(54) APPARATUS AND METHOD FOR ENFORCING HOMOGENEITY WITHIN PARTITIONS OF HETEROGENEOUS COMPUTER SYSTEMS

(75) Inventor: Scott Lynn Michaelis, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 700 days.

(21) Appl. No.: 10/400,856

(22) Filed: Mar. 27, 2003

(65) Prior Publication Data

US 2004/0193861 A1 Sep. 30, 2004

(51) Int. Cl.
 G06F 9/00 (2006.01)
 G06F 9/46 (2006.01)
 G06F 15/76 (2006.01)

(52) U.S. Cl. .................. 713/1; 713/2; 713/100; 712/6; 712/13; 718/102; 718/104

(58) Field of Classification Search .............. 713/1, 713/2, 100; 712/6, 13; 718/102, 104
See application file for complete search history.

(56) References Cited

U.S. PATENT DOCUMENTS

| | | | |
|---|---|---|---|
| 6,289,391 B1 * | 9/2001 | Smith et al. | 719/312 |
| 6,438,679 B1 * | 8/2002 | Sollars | 712/208 |
| 2001/0047512 A1 * | 11/2001 | Szewerenko et al. | 717/10 |
| 2003/0070066 A1 * | 4/2003 | Cross et al. | 713/100 |
| 2003/0126587 A1 * | 7/2003 | Rosner et al. | 717/136 |
| 2004/0117171 A1 * | 6/2004 | Shortz | 703/22 |
| 2004/0143729 A1 * | 7/2004 | Bouchier et al. | 713/100 |

* cited by examiner

Primary Examiner—Thomas Lee
Assistant Examiner—Michael J Brown

(57) ABSTRACT

A heterogeneous computer system has multiple interconnected cells, each cell has multiple primary processors of the same Instruction Set Architecture (ISA) type, but different cells may have processors of different ISA types. Each cell has a cell type register readable by a processor external to the cell. The cell type register of each cell is used at system startup time to ensure that all processors of a system partition have compatible ISA types.

19 Claims, 3 Drawing Sheets

APPARATUS AND METHOD FOR ENFORCING HOMOGENEITY WITHIN PARTITIONS OF HETEROGENEOUS COMPUTER SYSTEMS

FIELD OF THE INVENTION

The apparatus and method relate to the field of computer systems and computer system firmware. In particular, they relate to heterogeneous computer systems having dynamically allocated elements

BACKGROUND OF THE INVENTION

Modern, high performance, computer systems typically have multiple processors. It is known that some computer systems have primary processors of multiple instruction set types, multiple processor systems having primary processors of multiple instruction set architectures (ISAs) are known herein as heterogeneous computer systems.

Heterogeneous computer systems offer advantages in that they may run application code written for a variety of processor types and operating systems.

In addition to primary processors, upon which operating system and user programs run, there are typically additional embedded processors of additional types. Embedded processors are typically provided for control of specific hardware devices, such as disk drives, in the system. In a computer system, embedded processors may also perform system management functions as monitoring of primary processor voltages and temperatures, control of cooling subsystems, as well as boot-time configuration of various system components.

Machine-language operating system code, including low level system code and BIOS (basic input-output system) code, is ISA specific. For example, machine-level code for a PA8800 will not run correctly on an Intel Itanium processor. In a heterogeneous computer system, each low-level operating system code module typically exists in a separately-compiled module for each primary processor type.

A family of high performance heterogeneous computer systems from Hewlett-Packard can be configured to use primary processors of two or more ISA types, including the Intel Itanium and PA8800 instruction set architectures.

In this family of computer systems, a field replaceable "cell" has several primary processor circuits of the same type, together with memory, circuitry for communicating with other cells over a backplane bus, input output (I/O) bus interface circuitry, JTAG (Joint Test Action Group) scan circuitry, and other circuitry. There may be one or more additional embedded processors in each cell to perform system management functions.

One or more cells, which may, but need not, be of the same type, are installed into a backplane. A heterogeneous computer system is formed when cells having two or more types of processors are inserted into the backplane.

This family of heterogeneous computer systems supports simultaneous execution of multiple operating systems, including multiprocessor variants of Windows-NT, Unix, VMS, and Linux. Multiple instances of each system are also supported. Each operating system instance operates in a partition of the computer system.

At system boot time, a group of processors of a particular type are assigned to operate in each partition. These processors may belong to more than one cell, but must all be of the same ISA. As the operating system instance running in the partition boots, or reinitializes; processors of the partition become aware of each other and appropriate task routing and assignment datastructures built in system memory. The process of processors becoming aware of each other and task routing and assignment datastructures being built in system memory is known herein as a Rendezvous of the processors.

It is known that nonvolatile memory circuits having board identification and timing information may be designed into modules of a computer system. Many Synchronous Dynamic Random Access Memory (SDRAM) modules contain serial memory devices having interface timing information recorded therein. Information in these memory devices is used to configure memory interface circuitry of the computer system such that the system will properly communicate with those memory modules actually installed in the system. The Peripheral Component Interconnect (PCI) bus specification provides for machine-readable identification registers within each peripheral device attached to a PCI bus, information read from these identification registers is typically used by an operating system to allocate bus address space and to determine appropriate drivers for each peripheral device.

Some prior heterogeneous computer systems have assigned processors to partitions according to the physical location of the processors in the system. In these systems, processors on cells installed in particular slots of the backplane are assigned to one partition, those in other slots are assigned to a second partition. Should cells be moved in the backplane, assignment of processors to partitions based on physical location may result in incompatible processors being assigned to a partition.

It is desirable to assign processors to system partitions in a simple, reliable, way. It is desirable to assign processors to partitions in a manner that ensures that each partition includes only compatible processors.

SUMMARY OF THE INVENTION

A machine-readable identification register is provided on each cell of a heterogeneous computer system. This identification register is read during system startup to identify an instruction set architecture (ISA) associated with each cell. The ISA information is used by the system management subsystem to ensure that mutually compatible processors are assigned to each partition of the system.

In a particular embodiment, the identification register is read by, and initial assignment of processors to partitions is performed by, a master processor of each partition. In another embodiment, the identification register is read by, and assignment of processors to partitions is performed by, a system management subsystem.

In an embodiment, the identification register is part of a field programmable gate array (FPGA) installed on each cell of the computer system.

In another embodiment, the identification register is a serially addressable nonvolatile memory.

DETAILED DESCRIPTION OF THE EMBODIMENTS

Figure 1:
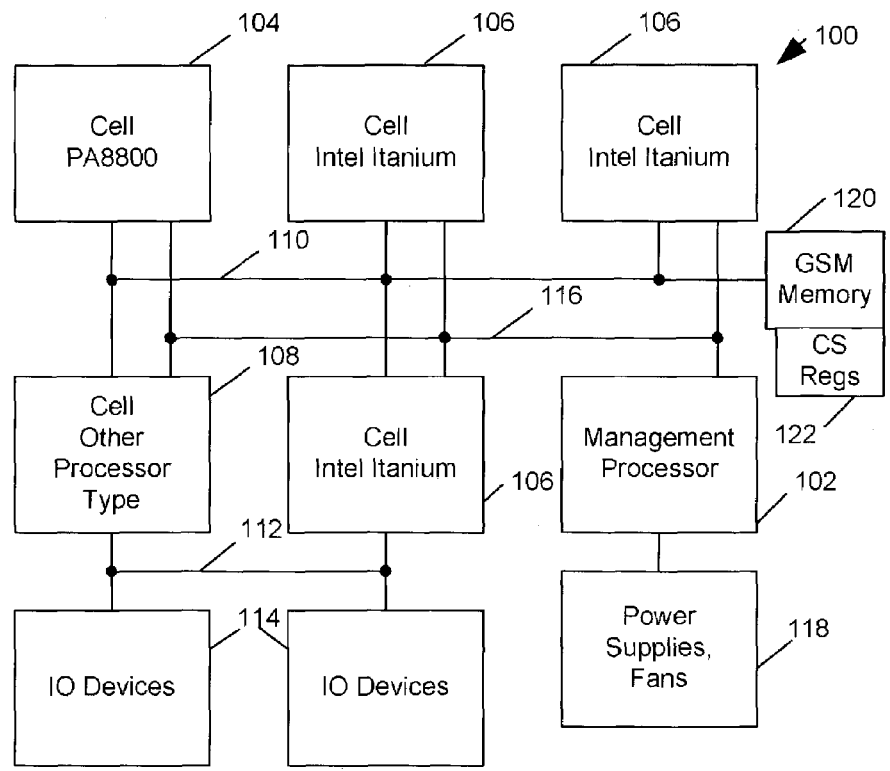
FIG. 1 is a block diagram of a heterogeneous computing system.
Figure 2:
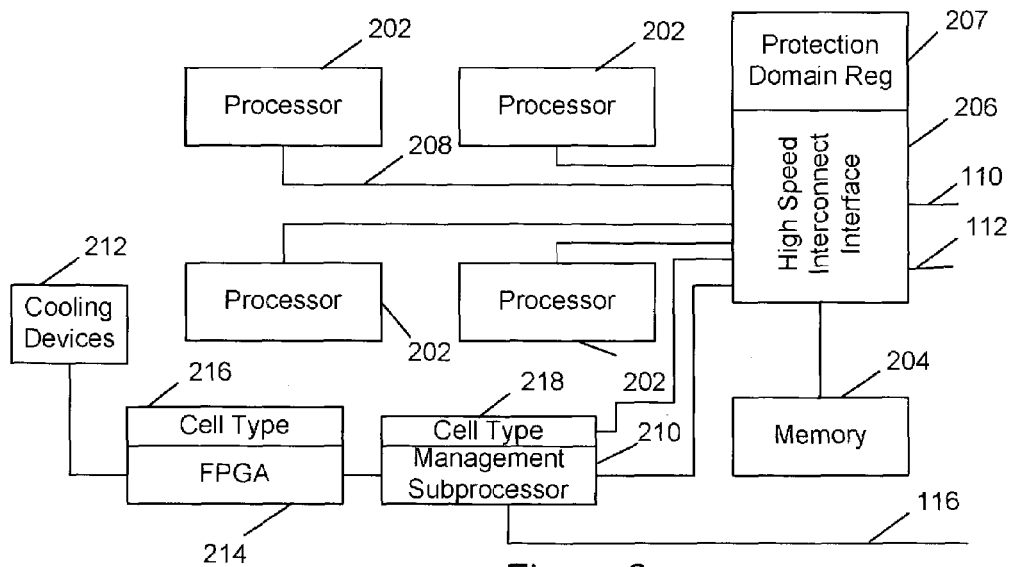
FIG. 2, a block diagram of a cell for a heterogeneous computing system.

A heterogeneous computer system 100 (FIG. 1) has a system management processor 102, and two or more processor cells 104, 106, and 108. Processor cells 104, 106, and 108 are of two or more ISA types. FIG. 2 is a detailed block diagram of a cell, such as cells 104, 106, and 108 of FIG. 1. With reference to FIG. 1 and FIG. 2, processor cells 104, 106, and 108 each have primary processors 202. Processor cells 104 embody primary processors of a first ISA type, while processor cells 106 embody processors of a second ISA type. In a particular embodiment, processor cells 104 embody processors 202 of the PA8800 type, while processor cells 106 embody processors 202 of the Intel Itanium type. Additional processor cells 108 may exist in the system 100, having additional types of processors, including in an embodiment processors of earlier Intel ISA types. In an embodiment, each cell has four primary processors, in another embodiment each cell has sixteen processors.

Cells of the system 100 are interconnected through high-speed interconnect 110. High-speed interconnect 110 provides for communications between cells. Some cells of the system 100 may also be coupled to I/O (Input/Output) interconnect 112. I/O interconnect 112 provides a path for communication between cells of the system, such as cell 108, and I/O devices 114. I/O devices 114 may include disk drives and network interface devices, as well as other peripherals.

Cells 104, 106, and 108 of the system 100 are connected to management processor 102 over a management interconnect 116. Management processor 102 is also coupled to control power supplies and fans 118.

In addition to primary processors 202, each cell (FIG. 2) also has a memory system 204, and a high-speed interconnect interface device 206. In a particular embodiment, high speed interconnect interface device 206 includes crossbar switching circuits, bus bridging circuits, and memory control circuits. In an embodiment, high speed interconnect interface device 206 includes a protection domain register 207 for specifying a protection domain to which the cell is assigned. High speed interconnect interface device 206 interfaces processor busses, such as processor bus 208, from primary processors 202 to memory system 204, to at least one high-speed system interconnect 110, and I/O interconnect 112.

Memory 204 of each cell is accessible from processors 202 of that cell, and from high speed interconnect 110. The high speed interconnect interface device 206 is capable of using protection domain register 207 to limit access to memory 204 by high speed interconnect 110 to references originating at other cells assigned to the protection domain specified in protection domain register 207.

A portion of system memory, which in an embodiment is memory 120 separate from the cells, may be configured as Globally Shared Memory (GSM). In an alternative embodiment, a portion of memory 204 of one or more cells is configurable to serve as GSM memory. GSM memory 120 includes Coherency Set (CS) registers 122. The CS registers include protection domain information whereby protection domains may be specified for each region of GSM memory. References to regions of GSM memory are rejected if they originate in processors of a protection domain other than those specifically permitted to access the region according to associated CS registers.

In one embodiment, primary processors 202 of each cell each are large integrated circuits each having multiple CPUs (Central Processor Units) together with multiple levels of cache memory. In one version of this embodiment, each processor 202 has four CPUs. It is anticipated that the number of effective CPUs per processor 202 may be greater than four.

Each cell also has a small management subprocessor 210, which in one embodiment is a microcontroller of the Intel 80251 type. It is anticipated that management subprocessor 210 may be a microcontroller of the Intel 8096, Motorola 6811 or 6805 type, or of another type as known in the art. Management subprocessor 210 is adapted for communication over management interconnect 116. In a particular embodiment, management subprocessor 210 controls cell-level cooling devices 212, and is capable of monitoring temperatures of the cells primary processors 202.

In a particular embodiment, management subprocessor 210 communicates to cooling devices 212 and other devices (not shown) through an FPGA (Field Programmable Gate Array) 214. In this embodiment, FPGA 214 includes a cell type register 216. In an alternative embodiment, adapatable to embodiments wherein management subprocessor 210 connects with cooling devices 210 without an FPGA 214, cell type register 218 is incorporated into firmware code of management subprocessor 210. In another embodiment, cell type register contents is readable to primary processors 202 of the cell.

Figure 3:
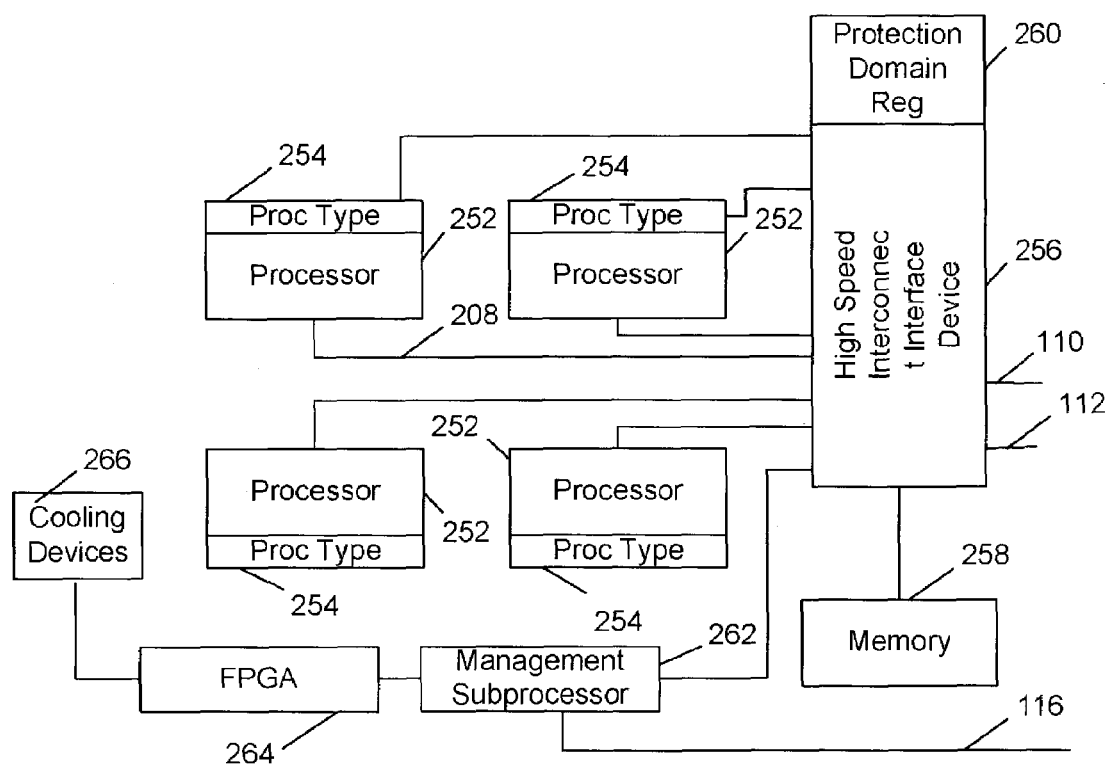
FIG. 3, a block diagram of an alternate embodiment of a cell for a heterogeneous computing system.

In an alternative embodiment, as illustrated in FIG. 3, there is a separate processor type register 254 associated with each processor integrated circuit of each cell; each processor integrated circuit includes one or more processor of primary processors 252. This arrangement is particularly adapted to embodiments having processors mounted on daughter cards, or for embodiments where the processor type register 254 is implemented within each processor integrated circuit.

Figures 4, 5:
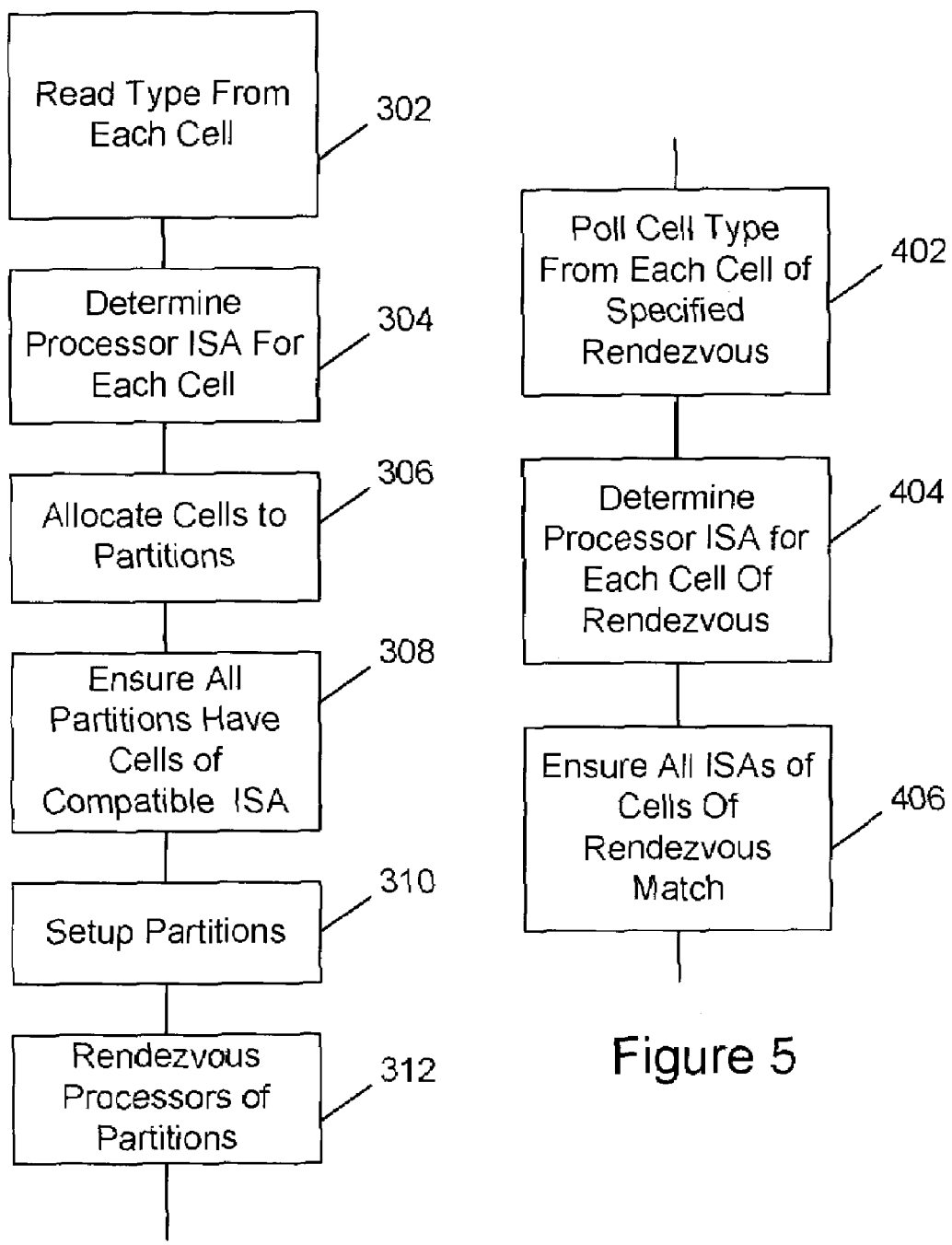
FIG. 4, a flowchart of processor allocation by the management processor at boot time.
FIG. 5, a flowchart of processor compatibility verification during partition rendezvous.

As with the embodiment of FIG. 2, the embodiment of FIG. 4 also has a high speed interconnect interface 256, memory 258, a protection domain register 260, a management processor 262, an FPGA 264, and cooling devices 266.

At system boot time, a particular primary processor 202 of primary processors 202 reads 302 a cell type register 302 from each cell 104, 106, 108. In one embodiment, a read request is transferred over management interconnect 116 to the cell. This read request is answered by management subprocessor 210 of the cell with information read from the cell type register 216 or 218. Management processor 102 uses the cell type information to determine 304 an ISA type of the processors of each cell. In one embodiment, determining an ISA type of each cell is performed by extracting an ISA type field from the cell type 302. Cells are then allocated 306 to partitions according to desired system configuration information and in such manner that the management processor ensures 308 that all processors of each partition have compatible ISAs.

In an alternative embodiment, at system boot time a particular primary processor 252 (which becomes a master processor of the cell) of primary processors 252 or 252 reads 302 a cell type register 254 associated with each processor 252 of the cell. The master processor of the processors 252 of the cell uses the processor type information to determine 304 an ISA type of the processors of each cell. If the processors of the cell are not all compatible with the ISA type of the master, processor, an error message is generated and those processors having ISA type differing from the master processor ISA type are disabled. Cells are then allocated 306 to partitions according to desired system configuration information and in such manner that all processors of each partition have compatible ISAs.

Partitions are then setup 310 such that each processor of each partition can correctly rendezvous 312 with processors of the partition as each operating system boots.

Setup 310 of partitions includes configuring the protection domain registers 307 of each cell to contain a protection domain code associated with the partition to which processors of that cell are assigned. Region of GSM memory are also assigned to each partition, and to each group of partitions permitted to communicate with each other. Setup 310 of partitions also includes configuration of CS registers of each assigned region of GSM memory to prevent unauthorized access of each region.

Once processors are assigned to partitions, processors of those partitions are permitted to rendezvous.

During rendezvous, a master processor of each partition polls 402 (FIG. 5) other cells of the partition to determine the cell type of that partition, and to determine 404 the ISA of each processor of the partition. These determined ISAs are compared with the cell type of the master processor to ensure 406 that all processor ISAs of a partition match. In the event that processor ISAs do not match, an error is declared and operation of incompatible processors of the partition is suspended. Operating system boot continues with the remaining, compatible, processors.

While the forgoing has been particularly shown and described with reference to particular embodiments thereof, it will be understood by those skilled in the art that various other changes in the form and details may be made without departing from the spirit and hereof. It is to be understood that various changes may be made in adapting the description to different embodiments without departing from the broader concepts disclosed herein and comprehended by the claims that follow.

What is claimed is:

1. A heterogeneous computer system comprising:
    a plurality of interconnected cells, each of the cells further comprising:
        at least one primary processor,
        a memory, and
        at least one type register readable by at least one processor selected from the group consisting of the primary processor and an optional management processor of the cell, the type register comprising instruction set architecture type information associated with the primary processor of the cell;
    wherein the primary processor of a first cell is of a first instruction set architecture type, and the primary processor of a second cell is of a second instruction set architecture type, wherein the second instruction set architecture type is incompatible with the first instruction set architecture type;
    wherein the system is capable of being partitioned into a plurality of partitions, wherein each partition comprises at least one of the cells and is capable of executing an operating system, and wherein at least one of the partitions comprises more than one of the cells; and
    wherein the system further comprises firmware capable of using the instruction set architecture type information in the type register of each of the plurality of cells during system startup to ensure that all said primary processors of each of the plurality of partitions have compatible instruction set architecture types.

2. The heterogeneous computer system of claim 1, wherein the at least one type register of each cell is readable by a physical management processor of the cell.

3. The heterogeneous computer system of claim 1, wherein the at least one type register is readable by the at least one primary processor of the cell.

4. The heterogeneous computer system of claim 3, wherein the at least one primary processor of the cell comprises at least four primary processors.

5. The heterogeneous computer system of claim 1, wherein there is a type register associated with each of at least two processor integrated circuits of at least one cell, and wherein the processor integrated circuits each contain at least one primary processor.

6. The heterogeneous computer system of claim 1, wherein each cell further comprises a protection domain register, where the protection domain register of at least one cell is capable of being configured to prevent access to memory of the cell by primary processors of cells assigned to different partitions, while allowing access by primary processors of cells assigned to the same partition.

7. A heterogeneous computer system comprising:
    a plurality of cells, each cell further comprising:
        at least one primary processor, where each primary processor has an instruction set architecture type,
        a memory coupled to the at least one processor,
        interconnect apparatus for enabling communication between the at least one primary processor of each cell and system interconnect of the heterogeneous computer system, and
        a cell type register; and
    a master processor coupled to each of the cells, wherein the master processor is capable of reading information contained in the cell type register of each cell and using that information to configure system partitions such that all processors of each partition have compatible instruction set architectures, and wherein at least one of the partitions comprises more than one of the cells;
    wherein the primary processor of a first cell is of a first instruction set architecture type, and the primary processor of a second cell is of a second instruction set architecture type, wherein the second instruction architecture type is incompatible with the first instruction set architecture type.

8. The heterogeneous computer system of claim 7, wherein the master processor is a primary processor of a cell of the system.

9. The heterogeneous computer system of claim 7, wherein the master processor reads information contained from the cell type register of each cell through a management subprocessor of each cell.

10. The heterogeneous computer system of claim 9, wherein at least one cell type register of a cell is located in a Field Programmable Gate Array (FPGA).

11. The heterogeneous computer system of claim 9, wherein at least one cell type register of a cell is located in a memory of the management subprocessor of the cell.

12. The heterogeneous computer system of claim 9, wherein there is a first cell having a plurality of primary processors of a first instruction set architecture type, and a second cell having a plurality of primary processors of a second instruction set architecture type.

13. The heterogeneous computer system of claim 12, wherein each cell has a protection domain register capable of restricting accesses by processors of other cells to processors assigned to the same protection domain as the cell.

14. The heterogeneous computer system of claim 13, further comprising globally shared memory.

15. The heterogeneous computer system of claim 14, wherein the globally shared memory is capable of division into a plurality of regions, wherein each region has associated coherency set registers, and wherein the coherency set registers of at least one region are coupled to restrict access to that region to cells assigned to particular protection domains.

16. A method of allocating cells to partitions in a heterogeneous computer system comprising the steps of:

reading type information from a type register of each cell of the heterogeneous computer system, where each cell comprises a plurality of primary processors of a particular instruction set architecture type;

determining an allocation of cells to partitions of the computer system such that each partition has processors of compatible instruction set architecture types as indicated by the instruction set architecture type, wherein at least one of the partitions comprises more than one of the cells; and setting up partitions of the computer system according to the allocation of cells to partitions;

wherein the primary processor of a first cell is of a first instruction set architecture type, and the primary processor of a second cell is of a second instruction set architecture type, wherein the second instruction set architecture type is incompatible with the first instruction set architecture type.

17. The method of claim 16, wherein the step of setting up partitions of the computer system further comprises setting protection domain registers of each cell and setting coherency set registers of at least one region of globally shared memory to prevent a partition from accessing a portion of globally shared memory that is allocated for exclusive access by another partition.

18. The method of claim 16, wherein at least one cell has a plurality of type registers each associated with a processor integrated circuit, and further comprising the step of verifying that all processors of that cell have processors of the same instruction set architecture type.

19. The method of claim 16, further comprising the steps of:

determining a master processor for each partition, with remaining processors becoming slave processors, and the master processor of at least one partition polling type registers associated with at least one slave processor of the partition to verify that the slave processor is of the same instruction set type as the master processor.

* * * * *

UNITED STATES PATENT AND TRADEMARK OFFICE
CERTIFICATE OF CORRECTION

PATENT NO. : 7,519,800 B2 Page 1 of 1
APPLICATION NO. : 10/400856
DATED : April 14, 2009
INVENTOR(S) : Scott Lynn Michaelis It is certified that error appears in the above-identified patent and that said Letters Patent is hereby corrected as shown below:

In column 5, line 13, delete "polis" and insert -- polls --, therefor.

Signed and Sealed this

Eighth Day of September, 2009

David J. Kappos
*Director of the United States Patent and Trademark Office*